April 7, 1959     K. T. KOENIG     2,880,637
LOCKING DEVICE FOR TORQUED NUTS

Filed Oct. 19, 1956     2 Sheets-Sheet 1

INVENTOR.
KARL T. KOENIG

BY Charles F. Dischler

ATTORNEY

April 7, 1959  K. T. KOENIG  2,880,637
LOCKING DEVICE FOR TORQUED NUTS
Filed Oct. 19, 1956  2 Sheets-Sheet 2

INVENTOR.
KARL T. KOENIG
BY
Charles F. Dischler
ATTORNEY

United States Patent Office 2,880,637
Patented Apr. 7, 1959

2,880,637

LOCKING DEVICE FOR TORQUED NUTS

Karl T. Koenig, Inglewood, Calif., assignor to North American Aviation, Inc.

Application October 19, 1956, Serial No. 617,190

6 Claims. (Cl. 81—10)

This invention relates to improvements in nut locks and particularly relates to a lock that can be applied to a nut after it is initially torqued and which thereby allows subsequent retorquing to be carried on from the head end of the bolt.

In the attachment of structural components to each other it is often necessary to tighten threaded fasteners to a given torque value to insure structural integrity of the assembly. This is a particularly acute problem in the aircraft industry, where, in keeping with current design trends, it is becoming more and more critical because of the use of integral wing fuel tanks wherein the sealing capabilities of the tanks are dependent to a great degree on the clamping ability of the fasteners securing the wing assemblies together. This clamping ability is a function of torque.

It has been determined that torque readings obtained at the head of a fastener are increasingly unreliable with increasing thickness of the material through which the fastener passes and also as the permissible clearance between the fastener and hole decreases. This is caused by friction between the shank of the fastener and the interior surface of the bore which causes the shank to bind within the bore. Shifting between the parts being assembled is another factor causing unreliable readings when a bolt or fastener is torqued from the head end.

A true torque reading, not affected by the above factors, can be obtained by applying torque to the nut. In this way tensile loading of a fastener can be much more accurately established and the desired clamping action secured.

To provide a device permitting initial torquing of the nut with subsequent retorquing from the head end, the present invention provides a separate nut lock for positioning over a nut which has been torqued to a predetermined value. This nut lock comprises a wrench-like retainer designed to slip over a standard nut and having a tang portion for bearing against adjacent structure and a separate spring clip having a looped portion for gripping the retainer and spring-like arms for insertion into an existing groove in the standard nut or the threads of the bolt thereby locking the retainer thereto and preventing substantial axial movement of the retainer relative to the bolt after it is fitted on the nut.

Consequently it is an object of this invention to provide a nut locking device that is readily attachable to or detachable from a standard commercial nut but yet one which can be positively attached to the nut and will resist vibration, impact and high stress loading.

It is also an object of this invention to provide a nut locking device that can be applied after the nut has been initially torqued.

Another object of this invention is to provide a nut locking device that can be applied to the nut with the tang portion of the wrench abutting adjacent fixed structure to prevent further rotation of the nut.

Still another object of the invention is to provide a nut lock that is applicable to standard type nuts.

A still further object of the invention is to provide a nut lock device that will prevent a torqued nut from turning, by abutment against adjoining structure, and which is attached to the nut by a spring-type clip.

Yet another object is to provide a nut locking device that is specifically adapted for use on structures and in areas wherein the nut is accessible on original installation but where subsequent installation makes the nut blind for all practical purposes.

A still further object of this invention is to provide a positive nut lock that does not depend on an auxiliary bolt, rivet or the like to anchor the locking device but which is detachably but securely fastened to the bolt or the nut being locked.

These and other objects and advantages of the present invention will become apparent to those skilled in the art after reading the present specification and the accompanying drawings forming a part hereof, in which.

Figure 1:
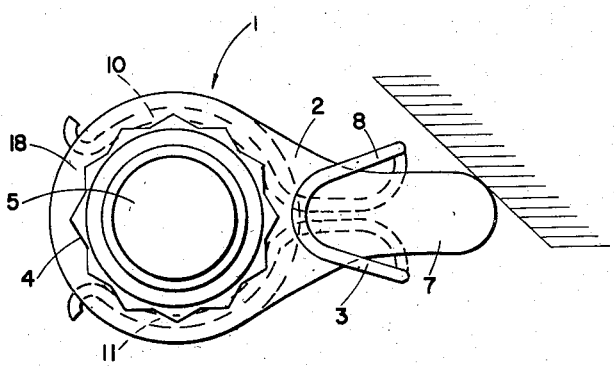
Fig. 1 is a top plan view of a preferred embodiment of the nut lock of this invention shown attached to a nut and bolt assembly and bearing against adjoining fixed structure.
Figure 3:
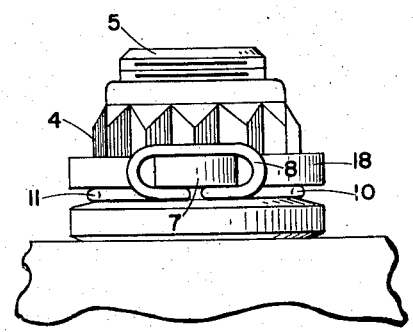
Fig. 3 is an end elevational view of the preferred embodiment of Fig. 1 looking from the tang end of the wrench.
Figure 6:
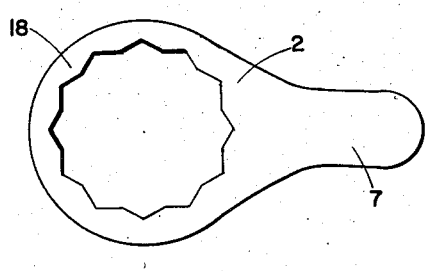
Fig. 6 is a plan form view of the preferred form of the wrench portion of the nut lock.
Figure 2:
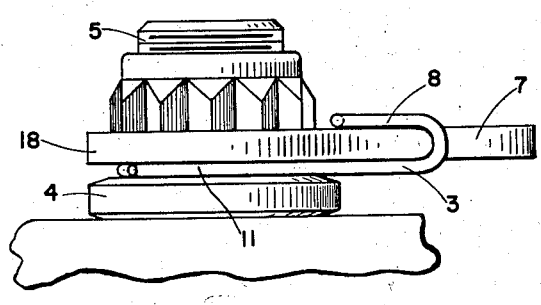
Fig. 2 is a side elevational view of the preferred embodiment shown in Fig. 1.

Referring specifically to the preferred embodiment of the invention shown in Figs. 1 through 6, numeral 1 generally designates the nut lock device comprised essentially of a wrench or retainer member 2 and spring clip 3 attached thereto and to a self locking nut 4 threadedly engaging a bolt 5. This nut may be of any standard type as long as it embodies one or more projections or wrench engaging surfaces. Generally a nut of the self-locking type is desirable. The standard twelve-point nut is illustrated and described in all of the embodiments set forth herein. In the case of the preferred embodiment such nut is commercially available with a peripheral groove located below the splines or points of the nut.

In greater detail, wrench 2 has a body portion 18 with a cut-out interior portion providing wrench jaws having a configuration complementary to the plan form of the nut being used, in this instance, a twelve-point configuration, although it could be hexagonal, square or the like. Integral with the body portion is a radially extending tail or tang 7 adapted to bear against adjacent fixed structure whereby the nut 4 may be retained against rotation when engaged by the wrench 2.

Figure 4:
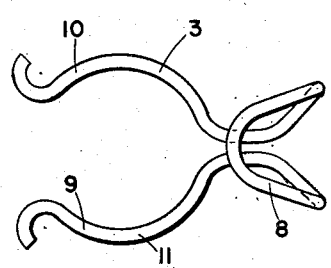
Fig. 4 is a top plan view of the preferred form of spring clip.
Figure 5:
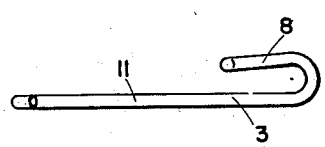
Fig. 5 is a side elevational view of the preferred form of spring clip.

The wrench or keeper 2 is retained on the nut by means of a spring clip designed to engage both the wrench 2 and the nut 4 whereby separation of the wrench from the nut is prevented. As best shown in Figs. 4 and 5 spring clip 3 is formed of a single piece of spring steel wire having the ends thereof bent to form an openended circular configuration 9 with oppositely disposed arms 10 and 11 having a slightly smaller degree of curvature than the nut groove and with the closed portion of the clip being bent upwardly and forwardly to form a tang receiving loop 8. It should be noted that the loop 8 is formed by being bent upwardly and then over and slightly downwardly toward the plane of the lower arms 10 and 11 to provide a spring gripping action on the tang 7 whereby clip 3 is securely engaged with the wrench. The forward ends of arms 10 and 11 each have a reverse-curve portion allowing the clip to be easily snapped over the nut.

In operation the nut and bolt fastener may be installed and tightened to design specifications by applying a measured torque to the nut. Wrench 2 is then seated on the nut in such a manner that the tang 7 is abutting or adjacent to fixed structure to prevent further rotation of the nut when the bolt is turned from the head end. Loop 8 of spring clip 3 is then slipped over tang 7 of the wrench until the spring clip arms 10 and 11 become seated in the nut groove with loop 8 firmly encircling and grasping the tang portion of the wrench. The securely anchored spring clip closely conforms to and grips the upper and lower surfaces of the wrench, thus preventing the wrench member 2 from inadvertent or accidental removal from the nut.

In restricted area locations, wherein it would not be possible to place spring clip 3 on the wrench after the latter is placed on the nut, the spring clip and wrench can first be assembled as a unit and then pressed downwardly onto the nut with the wrench tang extending outwardly in the desired direction.

Three separate modifications of the basic invention are shown in Figs. 7 to 8, Figs. 9 to 10 and Figs. 11 to 12 respectively. Each of these embodiments are attached to a standard nut of a type not incorporating the peripheral groove located below the wrench engaging flats or splines of the nut. Each of these modifications makes use of an unengaged thread at the upper portion of the bolt for attachment of the spring clip.

Figure 7:
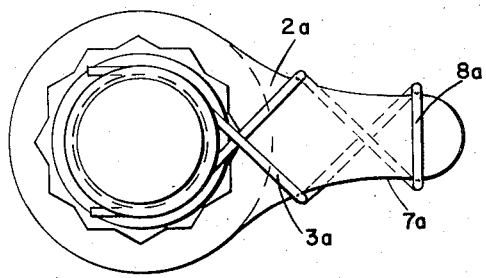
Fig. 7 is a top plan view of a modified form of nut lock.
Figure 8:
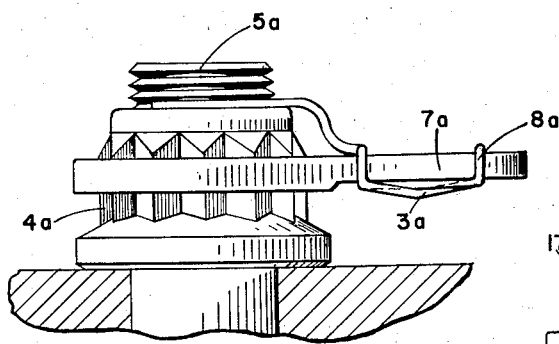
Fig. 8 is a side elevational view of the modified nut lock of Fig. 7.

The modification shown in Figs. 7 and 8 utilizes a wrench 2a similar to that of the preferred embodiment. The spring clip 3a, however, forms a loop 8a around the tang 7a, the arms of the spring clip then proceed diagonally forward and cross below the lower surface of the tang, then rise above the upper surface of the wrench, cross once more and are bent to fit into the bolt threads on opposite sides of the bolt. The manner of installation of this modified form of the invention is similar to that outlined above for the first described form of the invention. This has the advantage of requiring a nut 4a that does not need a separate groove in the base thereof but is a form in which the spring clip must necessarily be thinner as measured by the thread size and therefore consequently weaker.

Figure 9:
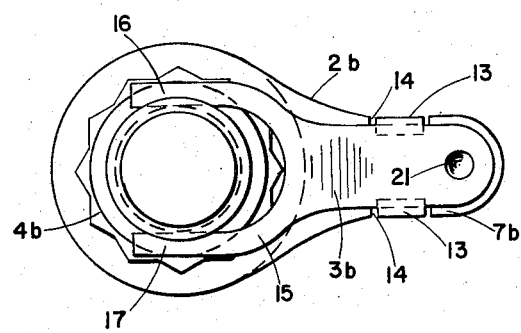
Fig. 9 is a top plan view of a second modification of the nut lock of this invention.
Figure 10:
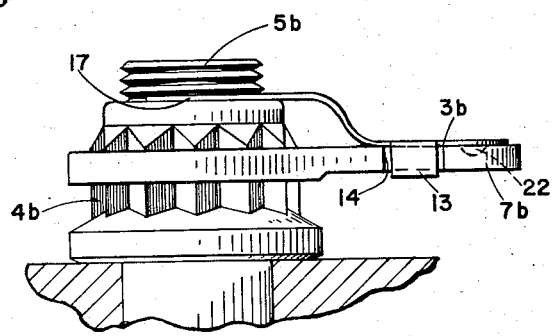
Fig. 10 is a side elevational view of the second nut lock modification.

The modification shown in Figs. 9 and 10 shows a wrench 2b having a pair of oppositely disposed transverse slots 14 cut in the side of the wrench tang 7b. A spring clip 3b is constructed with a rear portion 12 to closely overlie the tang portion with oppositely disposed downwardly extending side flaps 13 for flushly fitting into slots 14 and holding the wrench thereby. The forward portion 15 of the spring clip is raised to clear the top of the nut 4b and is bifurcated with each of the furcations 16 and 17 designed to engage a portion of thread on opposite sides of the bolt. This clip design has the same disadvantage as that of the previous modification of having the gauge of the spring clip determined by the thread size. Additionally, without the use of further detent means to be described hereinafter, the clip is not as securely attached to the tang portion of the wrench as in the two previous embodiments.

Figure 12:
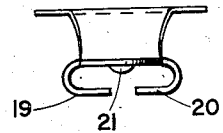
Fig. 12 is an end elevational view of the modified spring clip of Fig. 11.
Figure 11:
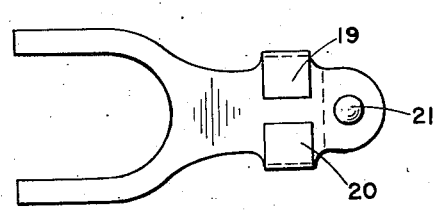
Fig. 11 is a bottom plan view of another modified form of spring clip.

Figs. 11 and 12 show a further modification of a spring clip which has side tabs 19 and 20 bent around to engage the bottom of the wrench and secure the spring clip thereto in this manner. Near the rear end of the spring clip a hemispherical depression 21 is formed for engaging a complementary depression 22 (see Fig. 10) in the wrench tang to form a detent to assist tabs 19 and 20 in securing the spring clip to the wrench and preventing longitudinal movement therebetween. For purpose of illustration such detent means is shown applied to the modification of Figs. 9 and 10 with which it could also be readily used.

It should be pointed out that the devices of this invention do not attempt to lock the nut to the bolt or screw but merely retain the nut against rotation for subsequent retorquing from the screw or bolt head. The locking of the nut to the bolt or screw is obtained by the use of standard commercially available self locking nuts which are well known in the art.

From the above description it is evident that this locking device is particularly adapted for use in areas that are accessible on the original installation but which become hidden or blind on subsequent final installation of bolted members. "Wet wings," i.e. fuel containing wings of modern high speed aircraft, furnish an illustration of such structures. Prior to final assembly of the milled wing skins the nuts may be properly torqued to conform to design stress specifications so that unnecessary loads are not introduced into the structure and the nut locking devices of this invention installed. After being subjected to the vibration, gravity and aerodynamic loading stresses of high speed flight such wings may begin to develop "leak areas." With the nuts held interiorly by the nut lock 1 the bolts may then be retorqued from the head end, where necessary, with the nuts retained against rotation, to eliminate such leakage.

The nut locking device of this invention can be installed and removed without requiring any special tools; and similarly no special nuts, bolts or screws are required for its use.

While particular embodiments of this invention have been illustrated and described herein, it will be apparent that various changes and modifications may be made in the construction and arrangement of the various parts without departing from the spirit and scope of this invention in its broader aspects or as defined in the following claims.

I claim:

1. A readily attachable nut lock for a nut having a circumferential groove thereon, said nut lock comprising a wrench having a nut engaging portion and a portion extending outwardly from the axis of the nut; and a resilient clamp having a loop formed at one end enclosing the extending wrench portion for gripping the same and a pair of spaced apart oppositely disposed finger elements at the other end located in said nut groove for securing said wrench to said nut.

2. A readily attachable nut lock for a nut having a circumferential groove thereon, said nut lock comprising a wrench having an extending tang portion terminating in a closed jaw having an aperture with a configuration similar to the nut plan form for fitting closely over said nut, said wrench being engageable on said nut subsequent to tightening of the nut with the tang portion adjacent suitable fixed structure, a one-piece spring clip adapted to be slipped onto said wrench and to engage said nut whereby the wrench will be held against longitudinal displacement relative to the nut, said spring clip having a closed loop at one end for gripping said tang portion and spaced apart arcuate portions at the other end for springing engagement with said nut groove.

3. A readily attachable nut lock for a standard nut having a circumferential groove thereon, said nut lock comprising a wrench having a nut engaging portion and an outwardly extending tang portion, and a continuous one-piece spring clip including a closed end portion bearing against the top of said wrench, side portions extending transversely over the edges of the wrench, and bottom portions extending along the lower surface of the wrench whereby said wrench is securely gripped by the spring clip, said bottom portions having oppositely disposed end portions with an arcuate configuration with a smaller radius of curvature than said nut circumferential groove whereby said arcuate end portions may be sprung into said groove thereby locking the wrench against axial movement relative to said nut.

4. A readily attachable nut lock for a nut having a circumferential groove thereon, said nut lock comprising a wrench having a closed jaw portion and an extending tang portion, said wrench being engageable on said nut subsequent to tightening of the nut with the tang portion adjacent suitable fixed structure; a one-piece generally U-shaped spring clip having the middle portion thereof bent upwardly and then forwardly to lie in a plane substantially parallel to the main portion of the spring clip and thus form a loop for engaging the tang portion of the wrench, the outer portions of the spring clip legs having an arcuate configuration complementary to the nut peripheral groove and clampable therein when said legs are sprung open.

5. A readily attachable nut lock for a nut having a circumferential groove thereon, said nut lock comprising a wrench having a nut engaging portion and an outwardly extending tang portion, and a spring clip for securely attaching said wrench to the nut, said clip including a first portion for embracing said tang portion and a second portion for engagement with said nut groove.

6. A readily attachable nut lock for a nut having a circumferential groove thereon, said nut lock comprising a wrench having a nut engaging portion and an outwardly extending tang portion, and a spring clip for securely attaching said wrench to the nut, said clip including a first closed loop portion for embracing said tang portion and a second portion having oppositely disposed arcuate leg elements for engagement with said nut groove whereby said wrench may be securely attached to said nut after installation of the nut.

References Cited in the file of this patent

UNITED STATES PATENTS

| | | |
|---|---|---|
| 448,385 | Unckrich | Mar. 17, 1891 |
| 539,692 | Lister | May 21, 1895 |
| 763,677 | Kocab | June 28, 1904 |
| 1,320,962 | Andrix | Nov. 4, 1919 |
| 2,387,545 | Veney | Oct. 23, 1945 |